United States Patent [19]
Salzmann

[11] Patent Number: 5,243,522
[45] Date of Patent: Sep. 7, 1993

[54] ELECTRICAL CONTROL APPARATUS FOR CONTROL OF AN AUTOMATIC TRANSMISSION APPARATUS WITH REMOTE MOTOR CONTROLLER CIRCUIT

[75] Inventor: David F. Salzmann, South Lyon, Mich.

[73] Assignee: Automotive Products (USA) Inc., Auburn Hills, Mich.

[21] Appl. No.: 630,164

[22] Filed: Dec. 19, 1990

[51] Int. Cl.⁵ .............................................. B60K 41/06
[52] U.S. Cl. .................................. 364/424.1; 74/335; 74/866
[58] Field of Search ............... 364/424.1; 74/335, 866; 318/293, 294

[56] References Cited

U.S. PATENT DOCUMENTS

| | | | |
|---|---|---|---|
| 4,581,565 | 4/1986 | Van Pelt et al. | 318/294 |
| 4,649,326 | 3/1987 | Mansmann et al. | 318/293 |
| 4,677,356 | 6/1987 | Tsuneda et al. | 318/293 X |
| 4,816,726 | 3/1989 | Novis et al. | 318/293 |
| 4,817,471 | 4/1989 | Tury | 74/866 |
| 4,841,793 | 6/1989 | Leigh-Monstevens et al. | 74/335 |
| 4,843,901 | 7/1989 | Peterson et al. | 74/335 |
| 4,859,916 | 8/1989 | McCambridge | 318/293 |
| 4,911,031 | 3/1990 | Yoshimura et al. | 74/335 |
| 4,922,769 | 5/1990 | Tury | 74/866 |
| 4,998,444 | 3/1991 | Mabee | 74/335 |
| 5,043,892 | 8/1991 | Brekkestran et al. | 364/424.1 |

Primary Examiner—Thomas G. Black
Assistant Examiner—Collin W. Park
Attorney, Agent, or Firm—Krass & Young

[57] ABSTRACT

This invention is an electrical control apparatus for control of an automatic transmission in a motor vehicle. The electrical control apparatus includes an operator input device for generating a desired transmission state signal, an encoder for generating a present transmission state signal from the position of a mode select shaft on the transmission, and a logic control unit developing signals enabling a motor controller circuit to control operation of a motor which changes the state of the automatic transmission. The motor controller circuit is disposed remotely from the logic control unit, preferably in a power module which also includes the motor, and the encoder. This location of the motor controller circuit advantageously reduces the need for a high current wire harness, improves the dynamic braking efficiency, enhances serviceability, reduces the size of the part of the apparatus which must be mounted in the crowded instrument panel and reduces the effect of noise on the logic control unit.

4 Claims, 6 Drawing Sheets

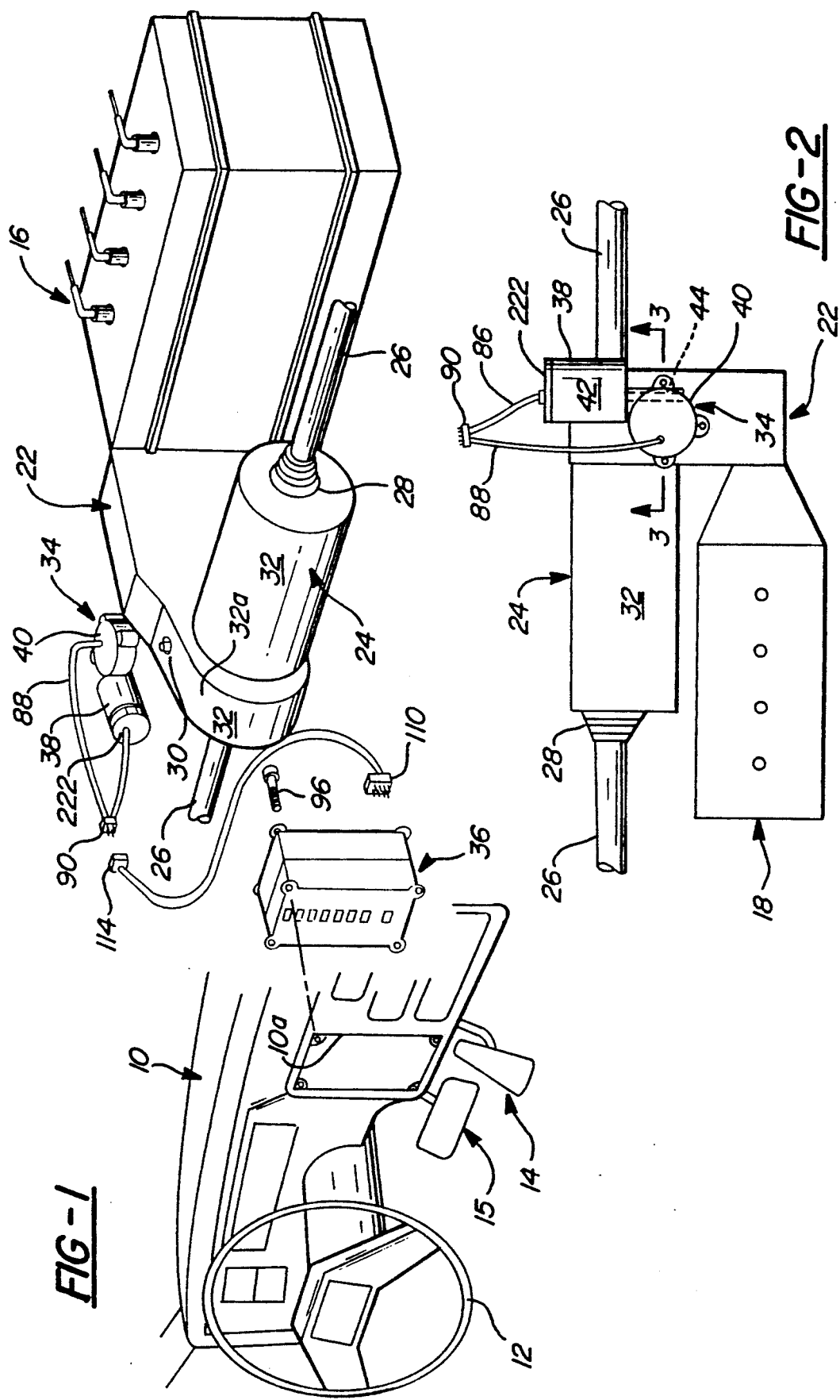

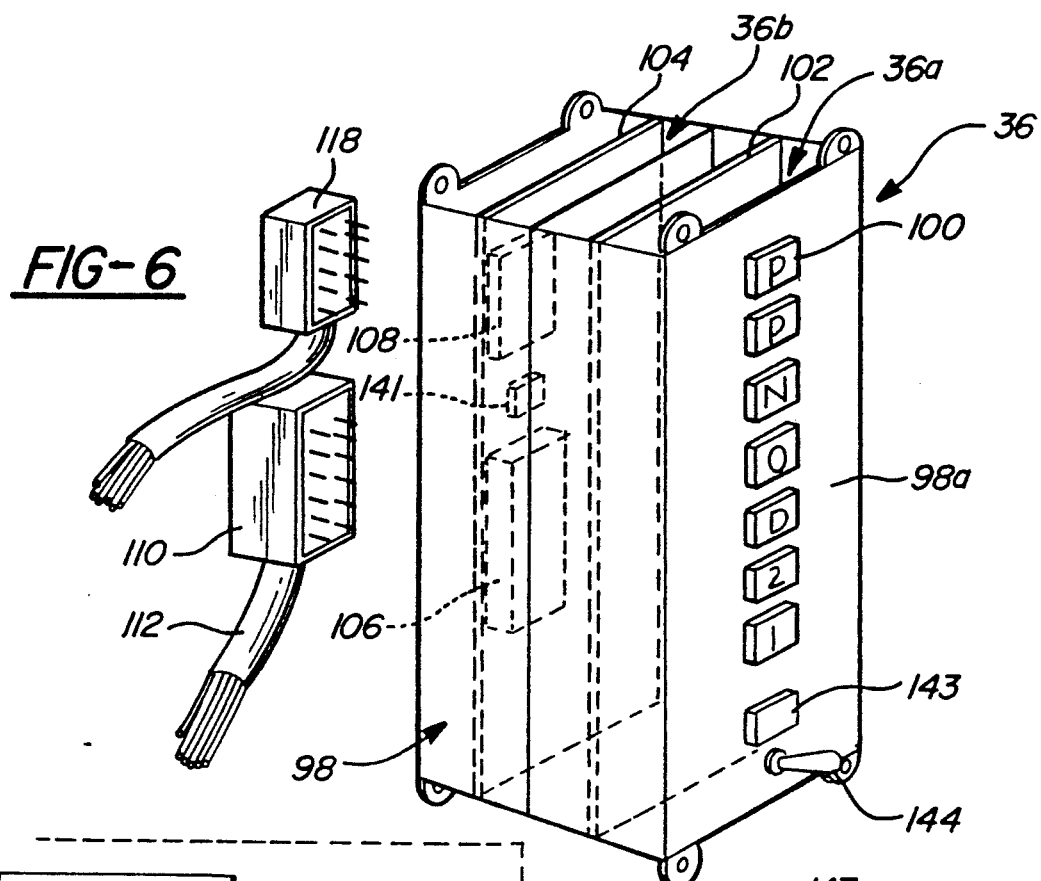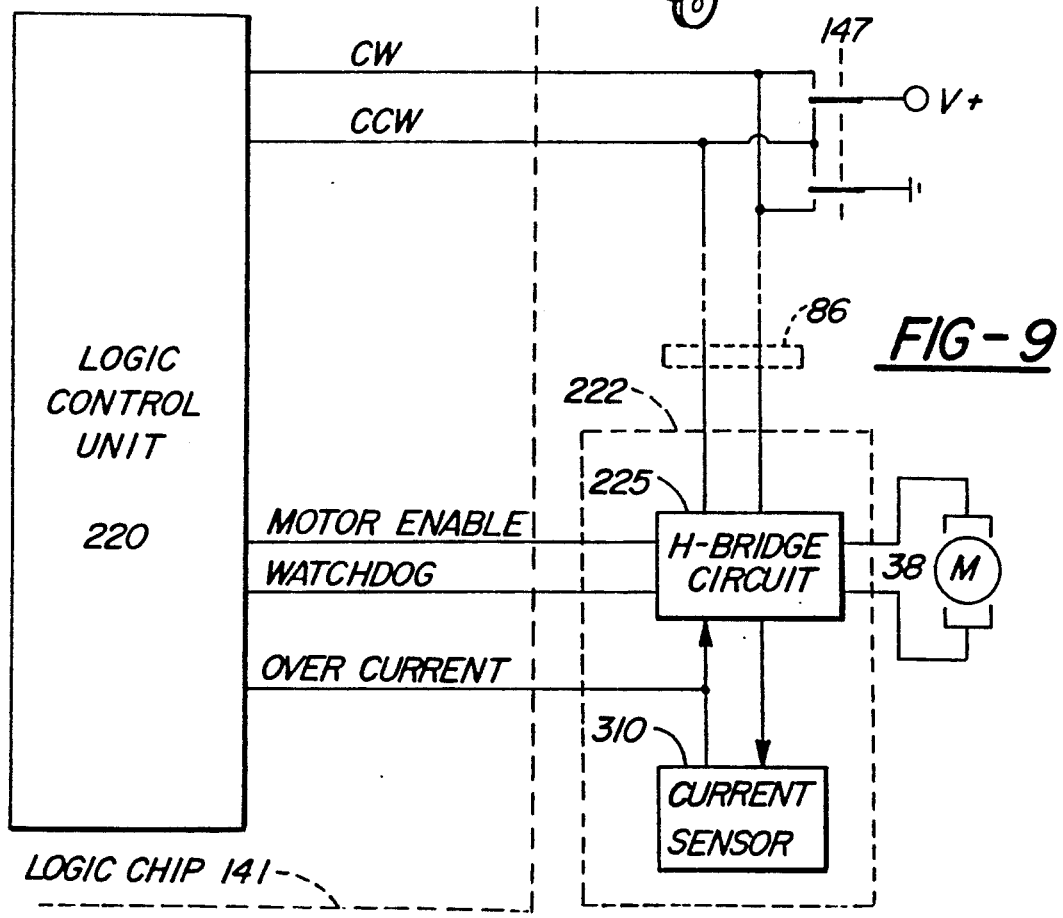

ELECTRICAL CONTROL APPARATUS FOR CONTROL OF AN AUTOMATIC TRANSMISSION APPARATUS WITH REMOTE MOTOR CONTROLLER CIRCUIT

TECHNICAL FIELD OF THE INVENTION

This invention relates to the field of electrical shift apparatus especially suited for use with a motor vehicle having an automatic transmission.

BACKGROUND OF THE INVENTION

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so called "automatic" transmissions have become popular in which much of the shifting is done without operator input in response to sensed speed and throttle opening parameters. These automatic transmissions typically include a mode select shaft positioned on the transmission housing and movable between a plurality of selectively rotated positions corresponding to a respective plurality of shift modes within the transmission. The mode select shaft is rotatively moved between its several shift positions by a mechanism extending from the mode select shaft to a suitable gear selector lever located in the passenger compartment of the vehicle. Various proposals have been made in the past to eliminate the mechanical interconnection between the driver operated lever and the mode select shaft and provide instead an electrical signal generated by a suitable action on the part of the driver and transmitted electrically to some manner of power means arranged to move the mode select shaft. None of these attempts to provide an electrical shift mechanism for an automatic transmission of a motor vehicle have met with any degree of commercial success since they provided a slow or imprecise shifting action and/or have generated excessive warranty and maintenance costs.

SUMMARY OF THE INVENTION

This invention is directed to the provision of an electrical control apparatus for the automatic transmission of a motor vehicle which provides positive and precise shifting, which is amenable to ready installation in the motor vehicle at the time of the original motor vehicle manufacture, and which is reliable in operation even over a long motor vehicle life.

The invention electrical control apparatus is intended for use with a motor vehicle having an automatic transmission of the type including a mode select shaft having a free end positioned outside of the transmission housing. An electric motor drives the mode select shaft through a speed reduction unit. A shaft encoder senses the shift position of the transmission and generates an encoder signal representative of the sensed shift position.

The electrical control apparatus receives input signals corresponding to the desired transmission state and the present state of the transmission. A logic control unit within the electrical control apparatus determines if the desired transmission state differs from the present transmission state. If the desired transmission state differs from the present state, the electrical control apparatus controls the motor for movement in the appropriate direction to shift the transmission to the desired transmission state. The logic control unit generates a clockwise motor drive signal if the desired transmission state is clockwise of the present transmission state and a counter-clockwise motor drive signal if the desire transmission state is counter-clockwise of the present state. A motor controller circuit supplies electric power to the motor in a first polarity for rotating this motor clockwise in response to the clockwise motor drive signal and in an opposite polarity for rotating this motor counter-clockwise in response to the counter-clockwise motor drive signal. The motor controller circuit electrically brakes the motor when neither the clockwise motor drive signal nor the counter-clockwise motor drive signal is generated.

In accordance with the present invention, the motor controller circuit is disposed remotely from the logic control unit. In the preferred embodiment the motor controller circuit is disposed in a power module which also includes the motor, the speed reduction unit and the encoder. This location of the motor controller circuit advantageously reduces the need for a high current wire harness, improves the dynamic braking efficiency, enhances serviceability, reduces the size of the part of the apparatus which must be mounted in the crowded instrument panel and reduces the effect of noise on the logic control unit.

BRIEF DESCRIPTION OF THE DRAWINGS

These and other objects and aspects of the present invention will become clear from the following description of the invention, in which:

FIG. 1 is a fragmentary perspective view of a front wheel drive motor vehicle embodying the invention electrical shift apparatus;

FIG. 2 is a fragmentary plan view of the front wheel drive assembly of the vehicle of FIG. 1;

FIG. 6 is a fragmentary perspective view of a control module employed in the invention electrical shift apparatus;

FIG. 9 is a schematic diagram of the connections between the logic chip and the motor controller circuit in accordance with an alternate embodiment.

DETAILED DESCRIPTION OF THE PREFERRED EMBODIMENT

Figure 3:
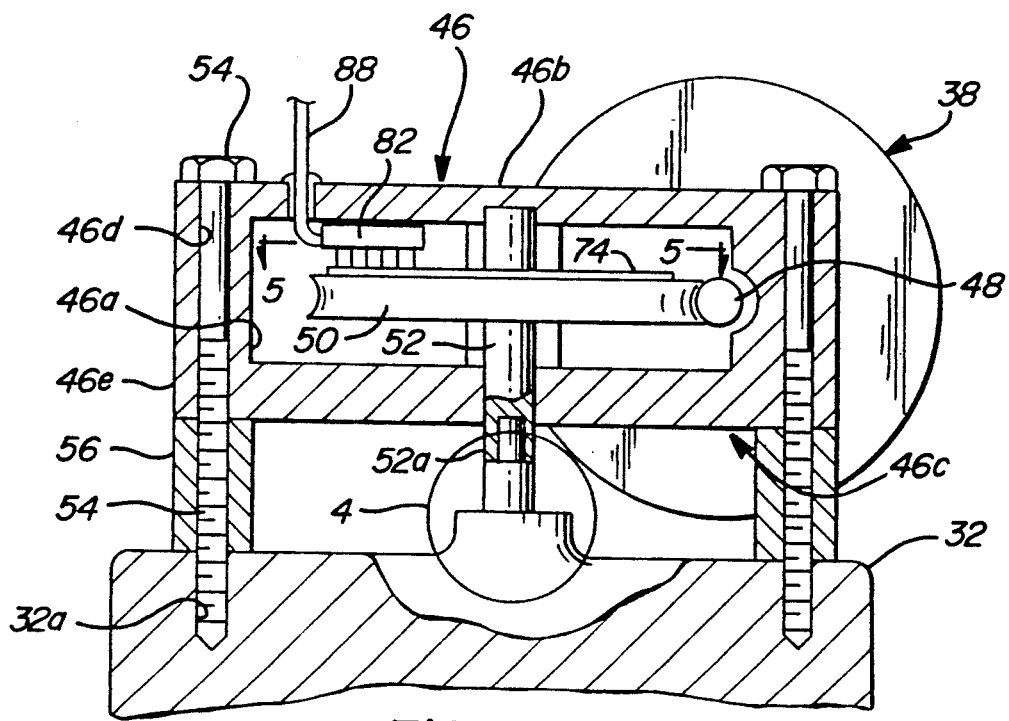
FIG. 3 is a view taken on line 3—3 of FIG. 2.

The electrical shift apparatus of the present invention is seen schematically in FIG. 1 in association with a motor vehicle of the type including an instrument panel assembly 10 positioned within the passenger compartment of the motor vehicle; a steering wheel 12 associated with the instrument panel; an accelerator pedal 14; a brake pedal 15; and a front wheel drive assembly 16.

Front wheel drive assembly 16 includes an internal combustion engine 18 mounted transversely in the engine compartment of the vehicle, a torque converter driven by engine 18, a gear drive assembly 22, an automatic transmission 24, and drive shafts 26 drivingly connected to the opposite ends of transmission 24 by U joints 28. Transmission 24 includes a mode select shaft 30 having a free upper end positioned above the housing 32 of the transmission 24 and operable in known manner in response to rotation of the shaft to operate internal devices within the transmission to position the transmission in a plurality of transmission modes such as park, neutral, drive, etc.

The invention electrical shift apparatus, broadly considered, comprises a power module 34 and a control module 36. Power module 34 is adapted to be bolted to transmission housing 32 in proximity to mode select shaft 30 and control module 36 is adapted to be positioned in the instrument panel assembly 10 of the vehicle for convenient operator access.

Power module 34 is in the form of a motor assembly and includes a DC electric motor 38 and a speed reduction unit 40. Motor 38 is a direct current motor having, for example, an output torque rating of 200 inch pounds, and includes a housing 42 and an output shaft 44. Speed reduction unit 40 includes a housing 46 fixedly secured to motor housing 42 and defining an internal cavity 46a, a worm gear 48 formed as a coaxial extension of motor output shaft 44 and extending into cavity 46a, a worm wheel 50 positioned in cavity 46a and driven by worm gear 48, and an output shaft 52 driven by worm wheel 50, journalled in housing walls 46b and 46c, and including a free lower end 52a positioned outside of and below housing wall 46c. Shaft lower end 52a includes a D shaped opening 52b for driving, coupling receipt of the D shaped upper end portion 30a of mode select shaft 30.

Figure 4:
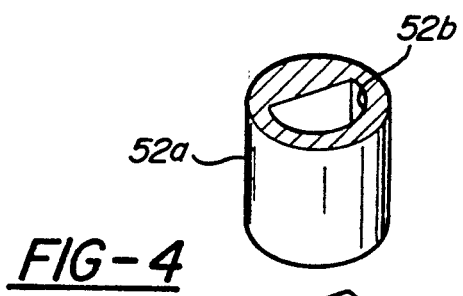
FIG. 4 is a fragmentary exploded perspective view of the structure within the circle 4 of FIG. 3.
Figure 5:
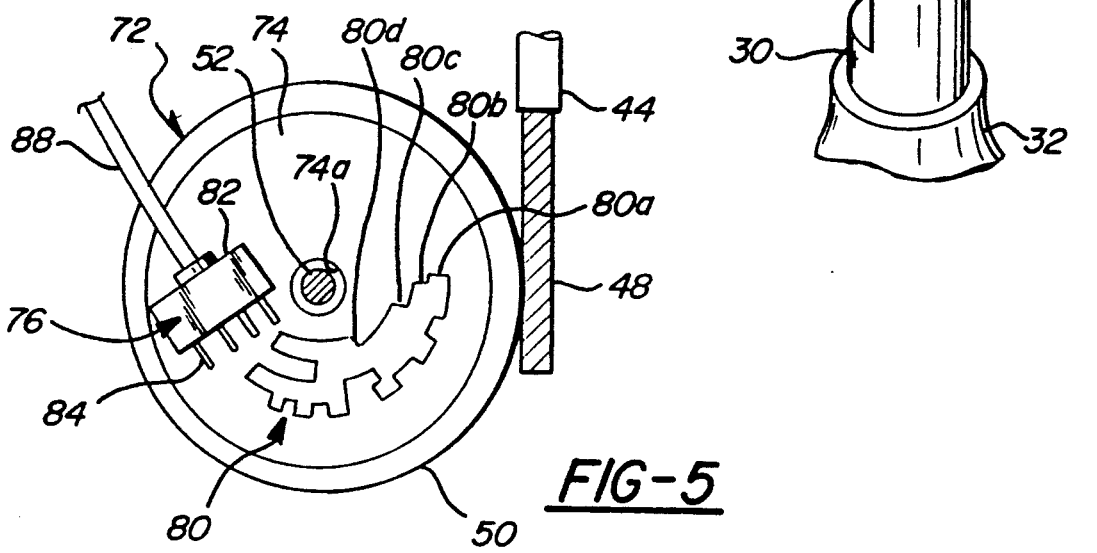
FIG. 5 is a view taken on line 5—5 of FIG. 3.

Power module 34 is mounted on the upper face of transmission housing 32 by a plurality of bolts 54 passing downwardly through bores 46d in lug portions 46e of reduction unit housing 46 and downwardly through spacers 56 for threaded receipt in tapped bores 32a in transmission housing 32. In assembled relation, reduction unit output shaft 52 is coaxially aligned with mode select shaft 30, and D opening 52b in reduction shaft lower end 52a telescopically receives D shaped upper end 30a of mode select shaft 30 so that actuation of motor 38 acts through worm shaft 48, worm wheel 50, and reduction unit output shaft 52 to drive mode select shaft 30. Note the D coupling illustrated in FIG. 4 is an example only, other forms of coaxial connection between the reduction unit output shaft 52 and mode select shaft 30 are feasible.

Power module 34 further includes an encoder assembly 72 operative to sense the instantaneous shift position of the transmission and generate an encoded signal representative of the sensed shift position Encoder assembly 72 includes an encoder wheel 74 and a pickup device 76. Encoder wheel 74 may be formed for example of a suitable plastic material and is secured to a side face of worm wheel 50 within reduction unit housing chamber 46a. Encoder wheel 74 includes a central aperture 74a passing speed reduction unit output shaft 52 and further includes code indicia 80 provided on the exposed outer face of the wheel and arranged along four arcuate tracks 80a, 80b, 80c and 80d centered on the center line of the encoder wheel.

Pickup device 76 includes a plastic body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a regulated voltage, such as ground, for the system.

Power module 34 further includes motor controller circuit 222. As illustrated in FIGS. 1 and 2, motor controller circuit 222 is mounted on the end of motor 38 and is connected to leads 86. Alternately, motor controller circuit 222 may be mounted in the cavity 46a within the housing 46. Motor controller circuit 222 responds to signals on lead 86 to control motor 38 for clockwise rotation, counter-clockwise rotation and dynamic braking.

Lead 86 from motor controller circuit 222 and a lead 88 from pickup device 76 are combined into a pin-type plug 90.

Control module 36 is intended for ready installation in an opening 10a in instrument panel 10 by insertion of the module from the rear of the panel and fastening of the module within opening 10a by the use of several fasteners such as 96 shown in FIG. 1. Module 36 includes a housing structure 98 of general box-like configuration enclosing an operator access or push button submodule 36a and a logic submodule 36b.

Push button submodule 36a includes a plurality of push buttons 100 positioned in vertically spaced relation in the front face 98a of the module housing and corresponding to the available transmission shift modes. Specifically, buttons 100 include buttons corresponding to park, reverse, neutral, over-drive, drive, second and first shift positions for the transmission. Buttons 100 coact in known manner with a printed circuit board 102 to generate suitable electrical signals in response to respective depression of the buttons 100. Note the vertical disposition of push buttons 100 illustrated in FIG. 6 is illustrative only. This invention may be practiced with other suitable arrangements of push buttons 100.

Logic submodule 36b includes an electronic printed circuit board 104 suitably electrically connected to printed circuit 102 and suitably mounting a first plurality of connector terminals 106 and a second plurality of connector terminals 108. Connector terminals 106 coact with a pin-type plug 110 at the end of a cable 112. Cable 112 includes plug 114 at its remote end for plugging receipt of plug 90 so that plug 110 embodies the information from leads 86 and 88. Connector terminals 108 coact with a pin-type plug 118. Plug 118 embodies the information from leads 120, 121, 122, 123, 125, 126, 128 and 129.

Lead 120 is associated with a switch 130 sensing the open or closed position of the driver's door of the vehicle. Lead 121 is associated with a switch 132 sensing the presence or absence of a driver on the driver's seat of the vehicle. Lead 122 senses the open or closed condition of the ignition switch 134 of the vehicle. Lead 123 is associated with accelerator switch 138 which detects the full open position of accelerator pedal 14. Lead 125 is connected to a speed sensor which provides information with respect to the instantaneous speed which the vehicle is traveling. Lead 126 is connected to an RPM sensor which provides information on the current revolutions per minute of engine 18. Lead 128 is connected with brake switch 133 which senses whether or not brake pedal 15 is actuated. Lead 129 is connected with seat belt switch 135 which senses whether or not the driver's seat belt is fastened.

The invention electrical shift assembly is delivered to the vehicle manufacturer in the form of power module 34 and control module 36. During the assembly of the vehicle, the power module 34 is mounted on the transmission housing 32 in coupling relation to mode select shaft 30 and the control module 36 is mounted in the instrument panel 10.

The mounting of power module 34 on the transmission housing is accomplished simply by positioning the lower end 52a of reduction shaft 52 over the upper end 30a of mode select shaft 30 and passing bolts 54 downwardly through bores 46d and spacets 56 for threaded engagement with tapped bores 32a in transmission housing 32.

Installation of control module 36 in instrument panel 10 is affected simply by moving the control module from the rear of the panel into the opening 10a and fastening the module in place by the use of fasteners 96 or the like. Following the plugging of plug 90 into plug 114 and the plugging of plugs 110 and 118 into connector terminals 106 and 108, the system is operational and ready for use.

Figure 7:
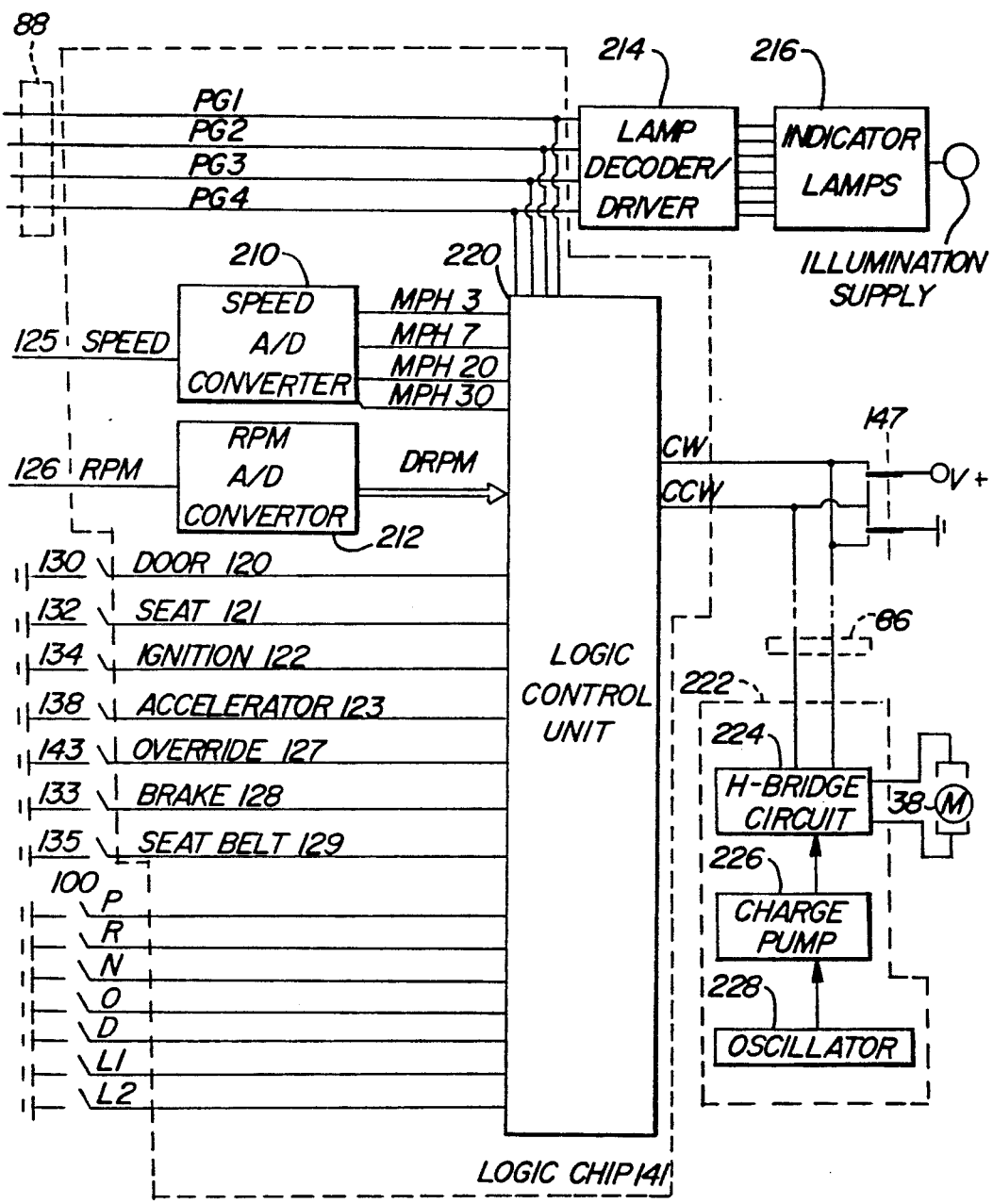
FIG. 7 is a schematic view of the electrical control apparatus of the present invention.

FIG. 7 illustrates a schematic block diagram of the electrical control apparatus of the present invention. This block diagram includes: speed analog-to-digital converter 210, RPM analog-to-digital converter 212, logic control unit 220, all of which are embodied in logic chip 141; limp home switch 147; lamp decoder/driver 214; indicator lamps 216; and motor controller circuit 222.

Logic control unit 220 receives the encoder output from encoder assembly 72, described above. Encoder assembly 72 produces four encoded signals PG1 to PG4. This encoding takes place, for example, in accordance with the coding table listed at Table 1.

TABLE 1

|  | PG1 | PG2 | PG3 | PG4 |
|---|---|---|---|---|
| Park | 0 | 0 | 0 | 1-0 |
| Reverse | 1 | 0 | 0 | 1-0 |
| Neutral | 1 | 1 | 0 | 1-0 |
| Overdrive | 0 | 1 | 0 | 1-0 |
| Drive | 0 | 1 | 1 | 1-0 |
| Low1 | 1 | 1 | 1 | 1-0 |
| Low2 | 1 | 0 | 1 | 1-0 |

Each unique combination of signals PG1, PG2 and PG3 indicates the angular range for a corresponding gear. The signal PG4 is used to indicate the exact center of any particular gear range being selected. The encoder assembly 72 causes signal PG4 to change from "1" to "0" when the exact center of the angular range of the selected gear is reached. When this transition in PG4 is detected, then the signals PG1, PG2 and PG3 are latched by logic control unit 220. This encoding technique ensures the mode select shaft 30 is precisely positioned when the DC electric motor 38 is stopped. As a consequence the transmission is reliably positioned in the desired gear.

Speed analog-to-digital converter 210 receives an analog signal indicative of speed on line 125. Speed analog-to-digital converter 210 generates an output signal on one or more of the output lines MPH3, MPH7, MPH20 and MPH30, depending upon the magnitude of the analog speed signal.

RPM analog-to-digital converter 212 receives an analog signal RPM indicative of engine revolutions per minute on line 126. RPM analog-to-digital converter 212 generates a multibit digital revolutions per minute signal DRPM corresponding to the magnitude of the analog engine revolutions per minute signal RPM.

Logic unit 220 preferably includes sufficient number of input lines to directly receive the signals from push buttons 100. These switches indicate to logic control unit 220 the desired transmission state selected by the operator.

Additional switches are connected to logic control unit 220. Door switch 130 is connected via line 120 and indicates the open/closed status of the driver's door. Seat switch 132 is connected via line 121 and indicates whether or not the driver's seat is occupied. Ignition switch 134 is connected via line 122 and indicates the status of the ignition switch. Accelerator switch 138 is connected via line 123 and indicates when accelerator pedal 14 is fully depressed. Override switch 143, which is on the front face of control module 36, in connected via line 127 and indicates operator selection of a manual override mode. Brake switch 133 is connected via line 128 and indicates the depression of brake pedal 15. Lastly, seat belt switch 135 is connected via line 129 and indicates the closure of the driver's seat belt.

Lamp decoder/driver 214 receives the present gear signals PG1 to PG4. Lamp decoder/driver 214 generates a signal to illuminate a single light of indicator lamps 216. In accordance with the preferred embodiment of the present invention each of the lamps of indicator lamps 216 is associated with one of the push-button switches 100. In particular, it is desirable that pushbuttons 100 comprise lighted push-button switches with the indicator lamps enclosed therein. The individual indicator lamps are preferably connected to the illumination supply in a manner that enables the intensity of these lamps to be adjusted in accordance with the adjustment of the intensity of the interior instruments.

Logic control unit 220 receives the above described input signals and generates two output signals. These include the clockwise motor drive signal and the counter-clockwise motor drive signal which are connected to motor controller circuit 222. In the embodiment of this example, clockwise motor motion corresponds to downshifting the transmission 24 and counter-clockwise motor motion corresponds to upshifting the transmission 24. Those skilled in the art would understand that this is just an example and the opposite convention can be employed.

In use various input signals, such as described above and illustrated in FIG. 7, are supplied to logic control unit 220. Logic control unit 220 is configured to receive these input signals and generate the necessary drive signals to motor 38 for providing the selection of the desired gear. Logic control unit 220 could be constructed of a programmed microprocessor circuit or it may be constructed in hardware logic in a programmable logic array or a gate array. The following description of the action of logic control units 220 is made in relation to Boolean equations which can be embodied in the logic circuits of a programmable logic array or gate array or which may be performed by a programmable microprocessor circuit. The exact implementation of these Boolean equations will differ depending on the type of circuit selected to embody logic control unit 220, however, these same processes are to be performed regardless of circuit type.

The operation of logic control unit 220 will now be described. Firstly, the various input signals are formed into a set of logic signals. The signals from push buttons 100 are formed into a set of desired gear signals PARK, RVRS, NTRL, OVDR, DRVE, LOW1 AND LOW2. One of these signals, corresponding to the desired gear selected by the last depressed push-button, is a logic "1" while the other of these signals are a logic "0". It is possible to employ a mechanical system which ensures that only one of the push buttons 100 can be depressed at a time. It is also possible to employ logic to produce the set of desired gear signals corresponding to the last depressed push button 100. Similarly the signals PG1 to PG4 permit generation of a set of present gear signals PGP, PGN, PGR, PGO, PGD, PGL1 and PGL2, one of which is active to indicate the present gear and the others of which are inactive. Logic control unit 220 receives the speed logic signals MPH3, MPH7, MPH20 and MPH30 from speed analog-to-digital converter 210. Logic control unit 220 generates an excessive engine revolution signal OVRRPM whenever the digital revolutions per minute signal DRPM indicates the engine revolutions per minute exceed a predetermined level. Logic control unit 220 forms signals from the switch inputs including: DOOR indicating the opened/closed status of the driver's door via door switch 130; SEAT indicating whether or not the driver's seat is occupied via seat switch 132; IGN indicating the status of the ignition switch; ACC indicating full depression of accelerator pedal 14; OVRD indicating override via switch 143; BRAKE indicating depression of the brake pedal 15 via switch 133; and SBELT indicating the closure of the driver's seat belt via switch 135.

Logic control unit 220 serves to compare the inputs indicating the desired gear with the inputs indicating the present gear. If they differ, then logic control unit 220 generates an output signal to motor 38 to rotate the motor until the present gear matches the desired gear. This process includes an indication of which shifts are upshifts (counter-clockwise motor rotation) and which are down shifts (clockwise motor rotation) according to the following Boolean equations:

UP1 = PGL1

UP2 = PGL2 and Not (LOW1)

UP3 = PGD and (not (LOW2) and Not (LOW1))

UP4 = PGO and (NTRL or RVRS or PARK)

UP5 = PGN and (RVRS or PARK)

UP6 = PGR and PARK

UPSHFT = UP1 or UP2 or UP3 or UP4 or UP5 or UP6

DNSHFT = Not (UPSHFT) or ACC

Thus an up shift is required if the present gear is low1 (UP1), or the present gear is low2 and low1 is not requested (UP2), or the present gear is drive and neither low1 nor low2 are requested (UP3), or the present gear is overdrive and either neutral, reverse or park is selected (UP4), or the present gear is neutral and either reverse or park is selected (UP5), or the present gear is reverse and park is selected. A down shift is requested if none of the intermediate states are satisfied, that is the inverse of UPSHFT. A down shift is also requested if the accelerator is fully depressed (ACC). In this regard, the presence of the ACC signal causes the desired gear signals OVDR, DRVE and LOW1 to shift down. Thus OVDR is changed to DRVE, DRVE is changed to LOW2, and LOW2 is changed to LOW1 during any interval that ACC is active. This implements the well known "kick down" function of shifting to the next lower gear upon full depression of the accelerator.

Two motor drive signals CCW and CW are generated when the signals ENABLE and OK2SHFT are active and the respective UPSHFT or DNSHFT is active and shown below.

CCW = ENABLE and OK2SHFT and UPSHFT

CW = ENABLE and OK2SHFT and DNSHFT

The ENABLE signal generally requires the desired gear to differ from the present gear and certain safety conditions to be satisfied. As shown below, ENABLE is inactive when the desired gear is the same as the present gear.

ENABLE = ( GOLOW1 or GOLOW2 or
  GODRVE or GOOVDR or GONTROL or
  GORVRS or GOPARK ) and Not ( ( PGP or
  PGN) and OVRRPM )

These intermediate signals are formed as follows:

GOLOW1 = LOW1 and Not (PGL1) and Not(MPH20)

GOLOW2 = LOW2 and Not(PGL2) and Not(MPH30)

GODRVE = DRVE and Not(PGD)

GOOVDR = OVDR and Not(PGO)

GONTRL = NTRL and Not(PGN)

GORVRS = RVRS and Not(PGR) and Not(MPH7)

GOPARK = ( PARK and Not-(PGP) and
  Not(MPH3) ) or ( ( ( Not(IGN) or ( Not (DOOR)
  and Not(SEAT) ) ) and Not(PGP) and
  Not(MPH3) and Not(OVRD) )

Thus the logic control unit 220 does not permit a shift into low1 when the speed is in excess of 20 miles per hour, and likewise does not permit a shift to low2 if in excess of 30 miles per hour, to reverse if in excess of 7 miles per hour, or to park if in excess of 3 miles per hour. The second term in GOPARK automatically shifts to park if the ignition is switched off (Not(IGN)), or if the door is opened (Not(DOOR)) and the seat is empty (Not(SEAT)), the present gear is not park (Not(PGP)), the speed is not greater than 3 miles per hour (Not(MPH3)), and neutral override is not selected (Not(OVRD)). The final term of ENABLE is a drive line protection feature. This term prevents shift from either park or neutral in the event that the engine revolutions per minute exceeds a safety threshold (OVR-REV).

The signal OK2SHFT is a safety lockout signal. It is formed as follows:

OK2SHFT = ( (IGN and SEAT) or OVRD) and
  Not(PGR and MPH7)

Thus OK2SHFT permits shifts if the ignition switch is enabled and the driver's seat is occupied, or if a gear is selected and the override switch 143 is activated. In either event shifts are not permitted if the transmission is currently in reverse gear and the vehicle speed is above 7 miles per hour. If desired OK2SHFT may also require connection of the driver's seat belt to enable any shift by anding the SBELT signal to the equation for OK2SHFT. Also, it may be desired to require depression of brake pedal 15 to leave PARK gear by anding a term Not(PGP and Not (BRAKE)) to the equation for OK2SHFT.

The clockwise motor drive signal CW and the counter-clockwise motor drive signal CCW are generated by logic control unit 220 in accordance with the above Boolean equations. These signals are then conditioned via a one shot circuit before being applied to motor controller circuit 222. The length of time of the one shot circuit is set to be longer than the longest time for ordinary shifting. Thus if this time is exceeded some error condition has resulted and it is best to stop motor 38. A similar one shot circuit operates on the clockwise motor drive signal CW.

The electrical shift apparatus also preferably includes a limp home switch 144 as part of the push button submodule 36a. Limp home switch 144 is arranged to manually jog motor 38 in the event of a malfunction to enable the vehicle to be driven home or to a repair facility This limp home switch 144 is preferably a double pole double throw momentary contact switch with a center off position. Momentary actuation of limp home switch 144 in one direction causes generation of the counter-clockwise motor drive signal CW, in the same manner as generated by logic control unit 220. Similarly, momentary actuation of limp home switch 144 in the opposite direction generates the counter-clockwise motor drive signal CCW. These signals are applied to motor controller circuit 222 in the manner similar to the signals received from logic control unit 220. Limp home switch 144 thus permits the user of the motor vehicle to change the state of the automatic transmission in the event of some failure of the logic control unit 220.

Figure 8:
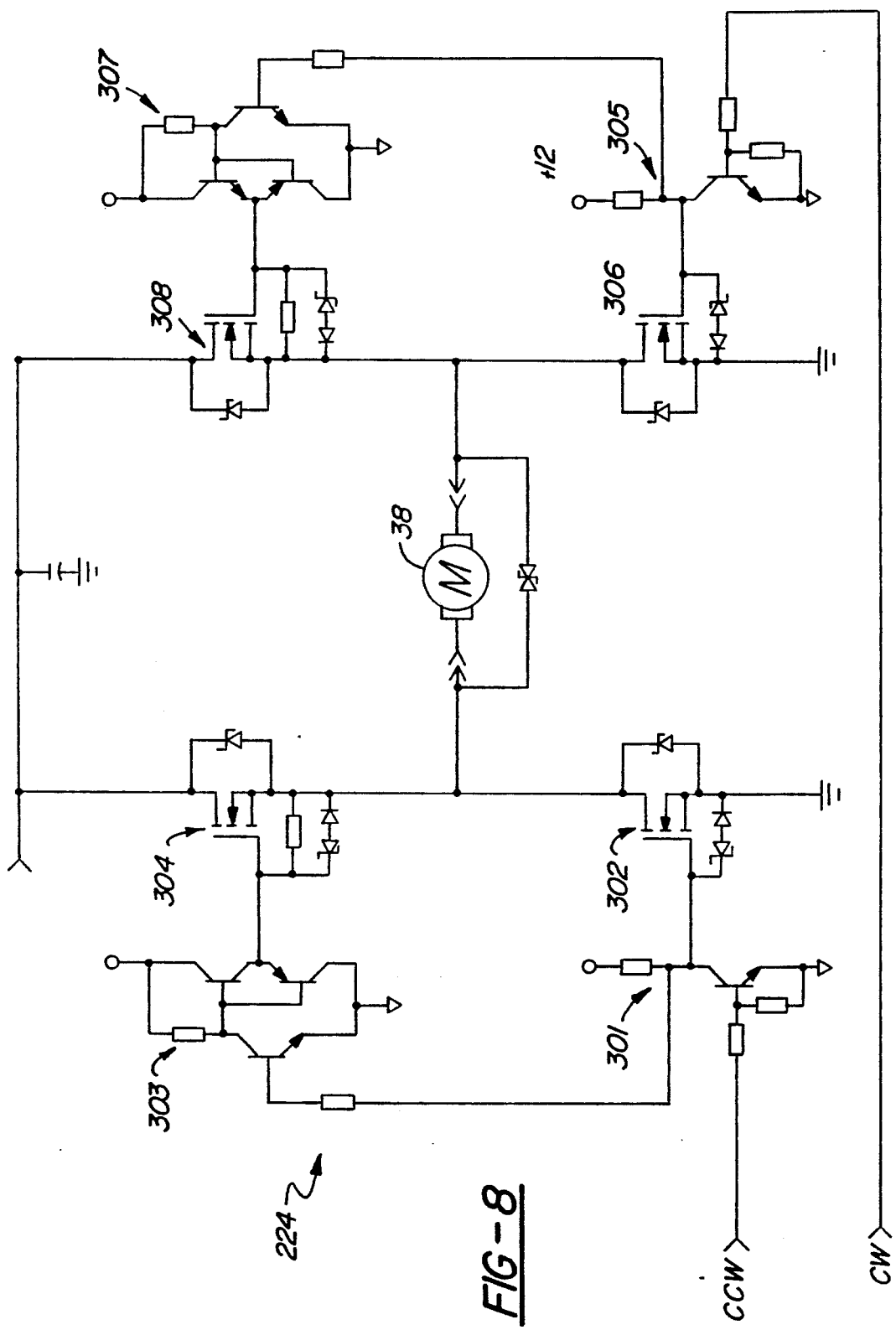
FIG. 8 is a schematic diagram of the motor controller circuit.

H-bridge circuit 224 is illustrated in detail in FIG. 8. The counter-clockwise motor drive signal CCW is applied to invertor 301. The output of invertor 301 is applied to field effect transistor 302 and to invertor 303. The output of buffer 303 is applied to field effect transistor 304. In a similar manner the clockwise motor drive signal CW is applied to the input of invertor 305. The output of invertor 305 is applied to field effect transistor 306. The output of invertor 305 is also applied to the input of invertor 307, which supplies the input to field effect transistor 308. Field effect transistors 302, 304, 306 and 308 operate as electrically controlled switches in this circuit.

Motor 38 is connected in an H configuration between field effect transistors 302, 304, 306 and 308. Both clockwise motor drive signal CW and counter-clockwise motor drive signal CCW are normally inactive at a low voltage. Thus the output of invertor 301 is high therefore field effect transistor 302 is conductive and field effect transistor 304 is not conductive. Similarly, field effect transistor 306 is normally conductive and field effect transistor 308 is normally not conductive. Thus both terminals of motor 38 are connected to ground.

Upon receipt of an active counter-clockwise motor drive signal CCW invertor 301 switches states. Thus field effect transistor 304 is turned on and field effect transistor 302 is turned off. Because field effect transistor 306 remains on, a current flows through motor 38 in a first direction through field effect transistors 304 and 306. When the desired shift position is reached, counter-clockwise motion drive signal CCW returns to the inactive low state. Thus field effect transistor 302 is turned on and field effect transistor 304 is turned off. Dynamic braking is achieved because both terminals of motor 38 are connected to ground (note field effect transistor 306 has remained conductive during this sequence).

When clockwise motor drive signal CW is active, field effect transistor 306 is turned off and field effect transistor 308 is turned on. This causes a current to flow through motor 38 in the opposite direction through field effect transistors 308 and 302. Likewise when the clockwise motor drive signal CW ceases motor 38 is dynamically braked by both terminals being connected to ground.

It is known in the art that N-channel field effect transistors require a gate voltage above their source voltage to turn fully on. Because the sources of field effect transistors 304 and 308 are tied to the motor vehicle 12 volt supply, these field effect transistors will not turn fully on absent a boosted gate voltage. The boosted voltage is supplied via a DC to DC power supply formed of oscillator 228 and charge pump 226. In the preferred embodiment oscillator 228 operates at about 40 KHz. Charge pump 226 operates in manner known in the art in response to the oscillatory signal from oscillator 228 to alternately charge capacitors to the vehicle 12 volt supply. These capacitors are effectively coupled in series to provide a doubled output voltage to H-bridge circuit 224. This doubled voltage is employed in invertors 303 and 307 to supply the base bias voltage to field effect transistors 304 and 308, respectively. Note that field effect transistors 302 and 306 do not need this boosted voltage due to the voltage drop across motor 38.

Figure 10:
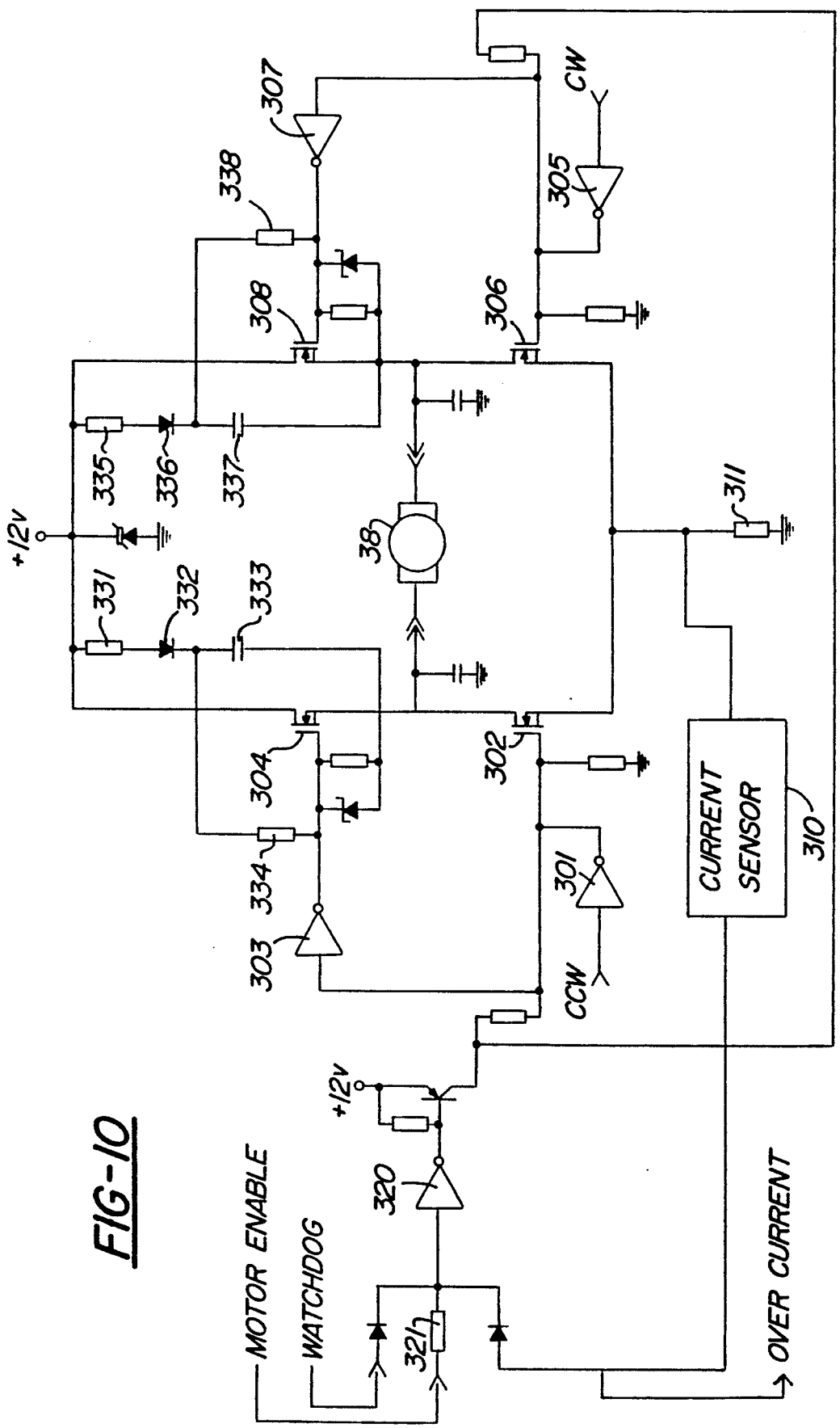
FIG. 10 is a schematic diagram of the details of the motor controller circuit illustrated in FIG. 9.

FIGS. 9 and 10 illustrate an alternative embodiment of this invention. FIG. 9 illustrates the connections between logic control unit 220 and motor controller circuit 222 in accordance with this alternative embodiment. FIG. 10 illustrates the alternative motor controller circuit 222 in further detail.

FIG. 9 illustrates the connection and interaction between logic control unit 220 and motor controller circuit 222 in the alternative embodiment. Logic chip 141 produces two additional signals in this embodiment, which are supplied to motor controller circuit 222. FIG. 9 illustrates only logic control unit 220 within logic chip 141. Other portions of logic chip 141 are as previously illustrated in FIG. 7.

The first of these new signals is a MOTOR ENABLE signal. The MOTOR ENABLE signal is employed to enable control of motor 38. The MOTOR ENABLE signal must precede supply of either the clockwise motor control signal CW or the counter-clockwise motor control signal CCW. The MOTOR ENABLE signal must also remain on during the dynamic braking interval.

The second of these signals is the WATCHDOG signal. In the event that logic control unit 220 is embodied as a microprocessor circuit, a watchdog circuit is employed. This watchdog circuit is normally inactive and does not produce an active WATCHDOG signal. However, the watchdog circuit includes a timer which changes the WATCHDOG signal to active upon expiration of a predetermined period of time. During normal operation of the microprocessor embodying logic control unit 220 the program calls for periodically resetting the watchdog timer. However, if for any reason the microprocessor ceases functioning, then eventually the timer in the watchdog circuit expires and the WATCHDOG signal becomes active. An active WATCHDOG signal serves to inhibit operation of motor controller circuit 222. It is considered prudent to inhibit shifting if the microprocessor fails in this manner.

Motor controller circuit 222 also produces a new signal coupled to logic chip 141. This new signal is the OVERCURRENT signal. This signal is produced by current sensor 310. The OVERCURRENT signal indicates that motor 38 is drawing excessive current. Logic chip 141 preferably stops production of the CW, CCW and MOTOR ENABLE signals upon detection of the OVERCURRENT signal.

FIG. 10 illustrates the motor controller circuit 222 of this alternative embodiment in further detail. Motor controller circuit 222 includes H-bridge circuit 225 which is similar to H-bridge circuit 224. If the MOTOR ENABLE signal is active, then field effect transistors 302, 304, 306 and 308 are turned on under the same conditions as previously described in conjunction with FIG. 8. If neither counter-clockwise motor control signal CCW nor clockwise motor control signal CW are active, then field effect transistors 302 and 306 are turned on. This dynamically brakes motor 38. If counter-clockwise motor control signal CCW is active and clockwise motor control signal CW is inactive, then field effect transistors 304 and 306 are turned on. This causes current to flow through motor 38 in one direction causing counter-clockwise motor rotation. If counter-clockwise motor control signal CCW is inactive and clockwise motor control signal CW is active, then field effect transistors 302 and 308 are turned on. This causes current to flow through motor 38 in the opposite direction causing counter-clockwise motor rotation.

The OVERCURRENT signal is produced by current sensor 310. When operating the entire motor current flows through resistor 311, regardless of the direction of motor rotation. This voltage drop is proportional to the current drawn by motor 38. Current sensor 310 compares this voltage drop across resistor 311 with a predetermined voltage. When the current through motor 38 exceeds a certain amount, the voltage across resistor 311 exceeds the predetermined voltage. Then output of current sensor 310 is high. This OVERCURRENT signal is supplied to logic chip 141 and is employed within motor controller circuit 222.

Gate circuit 320 provides a summation of the MOTOR ENABLE, OVERCURRENT and WATCHDOG signals. An active WATCHDOG signal causes the operational amplifier to ground the base of the transistor thereby cutting off the supply of gate voltage to field effect transistors 302 and 306. Thus neither the clockwise motor control signal nor the counter-clockwise control signal is effective to control motor 38. An active OVERCURRENT signal cuts of the supply of a gate voltage to field effect transistors 302 and 306 in the same fashion. Under normal circumstances an active MOTOR ENABLE signal supplies a low signal to the operational amplifier permitting the transistor to turn on and supply a gate voltage to field effect transistors 302 and 306. This also supplies a logic high to invertors 303 and 307, which thus turn off their respective field effect transistors 304 and 308. In this state, motor controller circuit 220 operates as previously described in conjunction with FIG. 8.

The provision of the MOTOR ENABLE signal serves two safety purposes. First, field effect transistors 302 and 306 are not continuously on. Thus any momentary glitch which might turn on either field effect transistor 304 or field effect transistor 308 does not result in a short between the +12 volt supply and ground. Such a short has the capability of damaging one of the field effect transistors. Second, the requirement of two signals to preform a shift, the MOTOR ENABLE signal and either clockwise motor control signal CW or counter-clockwise motor control signal CCW, means less likelihood of an unintentional shift.

Motor controller circuit 222 illustrated in FIG. 10 includes a further refinement over that of FIG. 8. The circuit of FIG. 10 does not require a boosted voltage supply to fully turn on the high side field effect transistors 304 and 308. Field effect transistors 304 and 308 require a gate voltage above the +12 volt supply voltage to turn fully on. This voltage is provided by capacitors 332 and 336, respectively.

This boosted gate voltage is provided by bootstrap circuits as follows. When MOTOR ENABLE is active and neither the clockwise motor control signal CW nor the counter-clockwise motor control signal CCW are active, then both field effect transistors 302 and 306 are turned on. Capacitor 333 charges through current limiting resistor 331 and diode 332 to the +12 volt supply less the voltage drop across field effect transistor 302. Capacitor 337 is likewise charged through resistor 335 and diode 336. When the clockwise motor control signal CW becomes active, field effect transistor 302 turns off. The charge across capacitor 333 is then discharged between the source and gate of field effect transistor 304. This provides a voltage to the gate of field effect transistor 304 greater than the voltage on its drain, thus turning field effect transistor 304 fully on. Capacitor 337 supplies a similar voltage to the gate of field effect transistor 308 when the counter-clockwise motor control signal CCW is active.

This boosted voltage must be maintained during the entire shift time. The maximum shift time is expected to be about 400 milliseconds. The capacitors may be selected with sufficient capacity to store enough charge to continue to supply the boosted gate voltage for this length of time. Alternately the motor control signal may be halted for a short time to refresh the charge on the capacitors. A time of 5 milliseconds should suffice. Such a short halt should not adversely effect the shift operation and may be used to slow the final transmission state shift.

Motor controller circuit 222 is preferably disposed remotely from logic chip 141 and near motor 38. In accordance with the preferred embodiment motor controller circuit 222 is disposed as part of power module 34 as illustrated in FIGS. 1 and 2. There are several reasons why this location is advantageous over locating motor controller circuit 222 in control module 36. Motor controller circuit 222 supplies a high current to motor 38. Location of motor controller circuit 222 in control module 36 would require a greater length of more high current capacity wire within lead 86. High current capacity wire requires greater conductive material than low current capacity wire and is consequently more expensive. Locating motor controller circuit 222 near motor 38 permits the wires from control module 36 to motor controller circuit 222 to be of the less expensive low current capacity type. High current capacity wire is only required for the short distance between motor 38 and the adjacent motor controller circuit 222.

This location increases the efficiency of the dynamic braking. The dynamic braking efficiency depends on the rate of motor energy dissipation, which is determined by the impedance of the current path. This current path includes the motor 38, field effect transistors 302 and 306 and the connecting wires. If motor controller circuit 222 were disposed in control module 36, then the relatively long current path through leads 86 would add to the impedance and increase the time required to brake the motor. Thus locating motor controller circuit 222 in the power module 34 provides better shifting performance by providing better dynamic braking.

Locating motor controller circuit 222 in power module 34 provides better serviceability of the automatic transmission electrical control apparatus. Premature failure of H-bridge circuit 224 could cause damage to motor 38 and vice versa. It is thus advantageous to insure these units are replaced at the same time. This simultaneous replacement is greatly facilitated by locating motor controller circuit 222 in power module 34. Otherwise this replacement would require access to both the power module 34 and to the control module 36 located in the instrument panel.

The size of control module 36 is reduced about 40% by location of motor controller circuit 222 in power module 34. This is advantageous because there is limited room for parts in the motor vehicle instrument panel. Locating the motor controller circuit 222 remote from the instrument panel thus frees space for other instrument panel circuits.

Lastly, this location of the motor controller circuit 222 can reduce noise problems in logic chip 141 if a charge pump is employed. Oscillator 228, required to produce the boosted voltage, tends to create noise in logic chip 141 and interfere with proper operation. Locating oscillator 228 remotely from logic chip 141 reduces this source of noise.

Whereas preferred embodiments of the invention have been illustrated and described in detail it will be apparent that various changes have been made in the disclosed embodiments not departing from the scope or spirit of the invention. In particular, although this invention has been described in conjunction with the transmission of a front wheel drive motor vehicle it is equally applicable to a rear wheel drive vehicle or to a four wheel drive vehicle. This application describes an automatic transmission controlled by rotation of a mode select shaft. Those skilled in the art would realize the invention can be practiced in electrical control of a "manual" transmission such as disclosed in U.S. Pat. Nos. 4,817,468 and 4,821,590, assigned to the assignee of this application. These patents disclose electric control of two degrees of freedom. The teachings of this application can be applied to a motor controller circuit for a motor for each degree of freedom. The motor vehicle need only include a transmission whose state can be changed employing a controlled motor.

I claim:

1. An electrical control apparatus for control of a transmission apparatus in a motor vehicle having a housing and a plurality of transmission states including a motor adapted for upshifts and downshifts, the electrical control apparatus comprising:
    an operator input means for generating a desired transmission state signal corresponding to manual operator input;
    means for mounting the operator input means in the passenger compartment of the motor vehicle;
    a transmission state sensing means for generating a present transmission state signal indicative of the state of the automatic transmission;
    means for mounting the state sensing means on the housing of the automatic transmission;
    a logic control unit connected to said operator input means and said transmission state sensing means including
        means for mounting the logic control unit in the passenger compartment of the motor vehicle;
        means for determining if said desired transmission state signal differs from said present transmission state signal,
        means for determining whether the desired transmission state is an upshift or a downshift from the present transmission state when said desired transmission state signal differs from said present transmission state signal,
        means for generating an upshift signal if the desired transmission state is an upshift from the present transmission state and said desired transmission state signal differs from said present transmission state signal, and
        means for generating a downshift signal if the desired transmission state is a downshift from the present transmission state and said desired transmission state signal differs from said present transmission state signal;
        a watch dog timer for generating a watchdog signal upon expiration of a predetermined period of time;
        means for periodically resetting said watchdog timer during normal operation before expiration of said predetermined period of time; and
    a motor controller circuit connected to the motor and to said logic control unit, and motor controller circuit including
        means for mounting the motor controller circuit on the housing of the automatic transmission;
        means for supplying electric power to the motor in a first polarity in response to receipt of said upshift signal;
        means for supplying electric power to the motor in a second polarity opposite to said first polarity in response to receipt of said downshift signal; and
        means for disabling supply of electric power to the motor in either said first polarity or said second polarity upon receipt of said watchdog signal.

2. An electrical control apparatus for control of a transmission apparatus in a motor vehicle having a housing and a plurality of transmission states including a motor adapted for upshifts and downshifts, wherein the motor vehicle includes an electric power supply having a first DC voltage source and a common voltage terminal, the motor having first and second terminals, the electrical control apparatus comprising:
    an operator input means for generating a desired transmission state signal corresponding to manual operator input;
    means for mounting the operator input means in the passenger compartment of the motor vehicle;
    a transmission state sensing means for generating a present transmission state signal indicative of the state of the automatic transmission;
    means for mounting the state sensing means on the housing of the automatic transmission;
    a logic control unit connected to said operator input means and said transmission state sensing means including means for mounting the logic control unit in the passenger compartment of the motor vehicle;

means for determining if said desired transmission state signal differs from said present transmission state signal, means for determining whether the desired transmission state is an upshift or a downshift from the present transmission state when said desired transmission state signal differs from said present transmission state signal, means for generating an upshift signal if the desired transmission state is an upshift from the present transmission state and said desired transmission state signal differs from said present transmission state signal, and means for generating a downshift signal if the desired transmission state is a downshift from the present transmission state and said desired transmission state signal differs from said present transmission state signal; and a motor controller circuit connected to the motor and to said logic control unit, and motor controller circuit including means for mounting the motor controller circuit on the housing of the automatic transmission;

means for supplying electric power to the motor in a first polarity in response to receipt of said upshift signal;

means for supplying electric power to the motor in a second polarity opposite to said first polarity in response to receipt of said downshift signal;

a first switch device connected between the first terminal of the motor and the common voltage terminal;

a second switch device connected between the first DC voltage source and the first terminal of the motor;

a third switch device connected between the second terminal of the motor and the common voltage terminal;

a fourth switch device connected between said first DC voltage source and the second terminal of the motor; and a switch control circuit connected to said first, second, third and fourth switch devices including means for controlling said first and fourth switch devices to be conductive thereby applying DC power to the motor in a first polarity upon receipt of only said upshift signal, means for controlling said second and third switch devices to be conductive thereby applying DC power to the motor in a second opposite polarity upon receipt of only said downshift signal;

means for controlling said first and third switch devices to be conductive thereby dynamically braking the motor upon receipt of neither said upshift signal nor said downshift signal; wherein said first, second, third and fourth switch devices each include respective first, second, third and fourth field effect transistors, each field effect transistor having a source, a drain and a gate, a first resistor having a first terminal connected to said drain of said second field effect transistor and a second terminal, a first diode having an anode connected to said second terminal of said first resistor and a cathode, a first capacitor having a first terminal connected to said cathode of said first diode and a second terminal connected to said source of said second field effect transistor, a first coupling between said first terminal of said first capacitor and said gate of said second field effect transistor, a second resistor having a first terminal connected to said drain of said fourth field effect transistor and a second terminal, a second diode having an anode connected to said second terminal of said second resistor and a cathode, a second capacitor having a first terminal connected to said cathode of said second diode and a second terminal connected to said source of said fourth field effect transistor, and a second coupling between said first terminal of said second capacitor and said gate of said fourth field effect transistor.

3. An electrical shift apparatus for use with a motor vehicle having an automatic transmission including a housing, and a mode select shaft to selectively shift the transmission between a plurality of shift positions, said apparatus comprising:

a power module connected to the mode select shaft including means for mounting the power module on the housing of the automatic transmission;

a motor assembly having an output shaft having means for drivingly connecting to the mode select shaft, an encoder means for generating a transmission state signal indicative of the shift position of the mode select shaft and including means for connecting to the mode select shaft, and a motor controller circuit electrically connected to said motor assembly for supplying electric power to said motor assembly in a first polarity in response to a first drive signal and for supplying electric power to said motor assembly in a second polarity opposite to said first polarity in response to a second drive signal; and a control module having means for mounting in the passenger compartment of the motor vehicle including an operator input means for generating a desired transmission state signal corresponding to manual operator input, and a logic control unit connected to said operator input means, said encoder means and said motor controller circuit for generating either said first drive signal or said second drive signal as required to control said motor assembly to drive the mode select shaft to the shift position corresponding to said desired transmission state, the logic control unit including a watch dog timer for generating a watchdog signal upon expiration of a predetermined period of time;

means for periodically resetting said watchdog timer during normal operation before expiration of said predetermined period of time;

and wherein the motor controller circuit further includes means for disabling supply of electric power to the motor in either said first polarity or said second polarity upon receipt of said watchdog signal.

4. An electrical shaft apparatus for use with a motor vehicle having an automatic transmission including a housing, and a mode select shaft to selectively shift the transmission between a plurality of shift positions, and apparatus comprising:
   a power module connected to the mode select shaft including
      means for mounting the power module on the housing of the automatic transmission;
      a motor assembly having an output shaft having drive means for connection to the mode select shaft,
      an encoder means having means for connecting to the mode select shaft for generating a transmission state signal indicative of the shift position of the mode select shaft, and
      a motor controller circuit electrically connected to said motor assembly for supplying electric power to said motor assembly in a first polarity in response to a first drive signal and for supplying electric power to said motor assembly in a second polarity opposite to said first polarity in response to a second drive signal;
      a first field effect transistor having a drain connected to the first terminal of the motor, a source connected to the common voltage terminal and a gate;
      a second field effect transistor having a drain connected to the first DC voltage source, a source connected to the first terminal of the motor and a gate;
      a third field effect transistor having a drain connected to the second terminal of the motor, a source connected to the common voltage terminal and a gate;
      a fourth field effect transistor having a drain connected to said first DC voltage source, a source connected to the second terminal of the motor and a gate;
      a switch control circuit connected to said first, second, third and fourth field effect transistors including
         means for supplying a voltage to said gate of said first and fourth field effect transistors thereby turning on said first and fourth field effect transistors and applying DC power to the motor in a first polarity upon receipt of only said first drive signal,
         means for supplying a voltage to said gate of said second and third field effect transistors thereby turning on said second and third field effect transistors and applying DC power to the motor in a second opposite polarity upon receipt of only said second drive signal,
         means for supplying a voltage to said gate of said first and third field effect transistors thereby turning on said first and third field effect transistors and dynamically braking the motor upon receipt of neither said first drive signal nor said second drive signal,
         a first bootstrap circuit including a first capacitor and means for charging said first capacitor when said first field effect transistor is turned on and means for connecting said first capacitor between said gate and said source of said second field effect transistor when said first field effect transistor is turned off, and
         a second bootstrap circuit including a second capacitor and means for charging said second capacitor when said third field effect transistor is turned on and means for connecting said second capacitor between said gate and said source of said fourth field effect transistor when said third field effect transistor is turned off; and
   a control module having means for mounting in the passenger compartment of the motor vehicle including
      an operator input means for generating a desired transmission state signal corresponding to manual operator input, and
      a logic control unit connected to said operator input means, said encoder means and said motor controller circuit for generating either said first drive signal or said second drive signal as required to control said motor assembly to drive the mode select shaft to the shift position corresponding to said desired transmission state, wherein
   said means for generating said first drive signal includes means for periodically interrupting supply of said first drive signal for a first interval of time selected to be sufficient to charge said first capacitor, and
   said means for generating said second drive signal includes means for periodically interrupting supply of said second drive signal for a second interval of time selected to be sufficient to charge said second capacitor.

* * * * *